United States Patent
Abali et al.

(10) Patent No.: US 11,477,172 B2
(45) Date of Patent: Oct. 18, 2022

(54) SECURING DATA COMPRESSION

(71) Applicant: INTERNATIONAL BUSINESS MACHINES CORPORATION, Armonk, NY (US)

(72) Inventors: Bulent Abali, Tenafly, NJ (US); Guerney D. H. Hunt, Yorktown Heights, NY (US); Paul Gregory Crumley, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 115 days.

(21) Appl. No.: 16/751,464

(22) Filed: Jan. 24, 2020

(65) Prior Publication Data

US 2021/0234841 A1    Jul. 29, 2021

(51) Int. Cl.
*G06F 13/00* (2006.01)
*H04L 9/40* (2022.01)
*H04L 51/58* (2022.01)

(52) U.S. Cl.
CPC .......... *H04L 63/0428* (2013.01); *H04L 51/58* (2022.05); *H04L 63/104* (2013.01); *H04L 63/123* (2013.01); *H04L 63/166* (2013.01)

(58) Field of Classification Search
CPC ... H04L 63/0428; H04L 51/38; H04L 63/104; H04L 63/123; H04L 63/166; H04L 63/045
USPC ..... 709/247, 246, 223, 224; 726/2–5, 26–30
See application file for complete search history.

(56) References Cited

U.S. PATENT DOCUMENTS

| | | | |
|---|---|---|---|
| 2,004,019 A | 6/1935 | Condon | |
| 4,172,213 A | 10/1979 | Barnes et al. | |
| 6,598,161 B1 | 7/2003 | Klutz | |
| 7,010,681 B1 | 3/2006 | Fletcher et al. | |
| 7,167,560 B2 | 1/2007 | Yu | |
| 10,938,685 B2* | 3/2021 | Indiresan | H04L 45/745 |
| 10,992,709 B2* | 4/2021 | Murgia | H04W 76/12 |
| 2004/0028227 A1* | 2/2004 | Yu | H04L 63/0478 380/201 |
| 2004/0249892 A1 | 12/2004 | Barriga et al. | |
| 2017/0164046 A1* | 6/2017 | Shamoon | H04N 21/2541 |
| 2018/0316723 A1* | 11/2018 | Murgia | H04L 63/164 |
| 2020/0036610 A1* | 1/2020 | Indiresan | H04L 43/062 |

OTHER PUBLICATIONS

Confidential activities and public use statement.
Engel et al., "Efficient transparent JPEG2000 encryption with format-compliant header protection." 2007 IEEE International Conference on Signal Processing and Communications. IEEE, 2007; (5 Pages).

(Continued)

*Primary Examiner* — Kenneth R Coulter
(74) *Attorney, Agent, or Firm* — Griffiths & Seaton PLLC

(57) ABSTRACT

Various embodiments are provided for securing data compression in a computer environment are presented. Encryption cycles of a data compression stream may be optimized by applying a first type of encryption on a first section and a last section of compressed data and a second type of encryption on a middle section of compressed data, the first type of encryption containing key information relating to the middle section of the compressed data.

20 Claims, 9 Drawing Sheets

(56) References Cited

OTHER PUBLICATIONS

Wu et al., "Design of Integrated Multimedia Compression and Encryption Systems", IEEE Transactions on Multimedia, vol. 7, No. 5, Oct. 2005; (12 Pages).
[GMR1996] On Breaking a Huffman Code David W. Gillman, Mojdeh Mohtashemi, and Ronald L. Rivest IEEE Transactions on Information Theory, vol. 42, No. 3, May 1996; (6 Pages).

\* cited by examiner

SECURING DATA COMPRESSION

BACKGROUND OF THE INVENTION

Field of the Invention

The present invention relates in general to computing systems, and more particularly to, various embodiments for securing data compression by a processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these computer systems. The amount of information to be processed nowadays increases greatly. Therefore, processing, storing, and retrieving very large amounts of information is a key problem to solve.

SUMMARY OF THE INVENTION

Various embodiments for securing data compression using one or more processors are provided. In one embodiment, by way of example only, a method for securing data compression, again by a processor, is provided. Encryption cycles of a data compression stream may be optimized by applying a first type of encryption on a first section and a last section of compressed data and a second type of encryption on a middle section of compressed data, the first type of encryption containing key information relating to the middle section of the compressed data.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
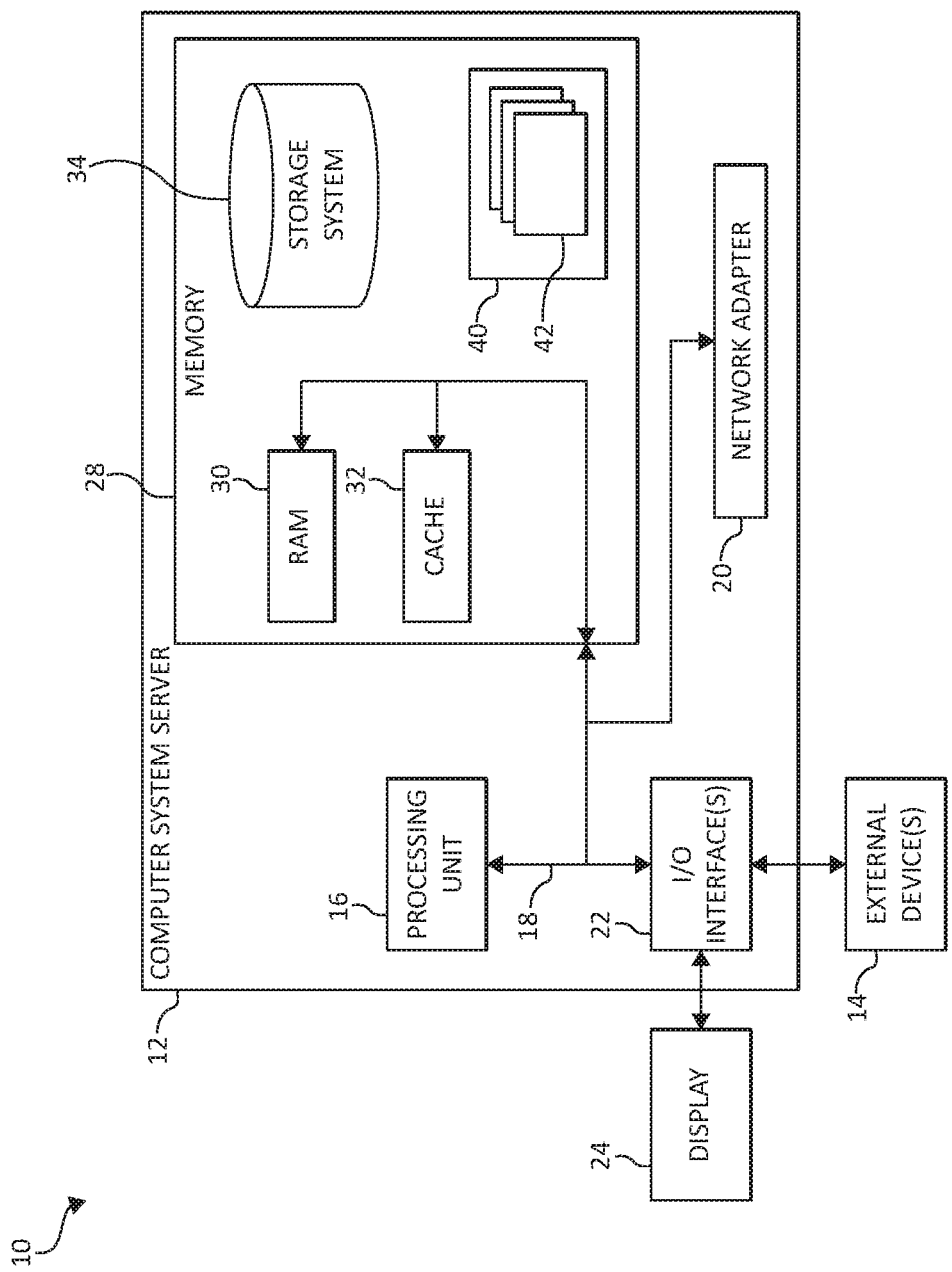
FIG. 1 is a block diagram depicting an exemplary computing node according to an embodiment of the present invention.

Increasing main memory, storage and network bandwidth is instrumental for increasing the performance of processor chips and accelerators. Designers have traditionally improved bandwidth by increasing the frequency or the pin count of the hardware interfaces. These techniques tend to have high area and energy costs. Furthermore, interface changes are slow, as new memory and input/output standards are proposed, for example, every 2 to 3 years. These challenges may be overcome by using data compression. That is, as systems become bandwidth constrained, data compression may be used to increase their effective bandwidth. Compression enables the memory systems to transfer data over fewer pins and fewer memory chips, thereby unlocking higher bandwidth.

Thus, many hardware and software applications use data compression to reduce memory and memory capacity and to reduce network and input/output ("I/O") bandwidth. Said differently, computer systems perform data compression to realize a more efficient use of finite storage space. The computer system typically includes a hardware component referred to as a compression accelerator (or decompression accelerator), which accepts work requests or data requests from the host system to compress or decompress one or more blocks of the requested data.

For example, many computing systems employ data compression to increase the effective storage capacity of data within the computing systems using data compression accelerators. In one aspect, the present invention provides for securing the output of data compression accelerators. For example, a hardware compression/decompression accelerator may be augmented with a hardware efficient crypto engine. To achieve increased throughput of a data compress stream, the present invention may budget the encryption cycles by using strong encryption in the front (e.g., header) and rear compressed data (e.g., trailer) which contain key information about the middle compressed data. Without the front and rear data, decoding the compressed middle data is extremely difficult and challenging, if not impossible even for unsecured data. Therefore, the present invention uses encrypted data at a higher bandwidth than prior art using a data compression operation (e.g., 18 gigabytes per second "GB/S" increased to 102 GB/S) to save encryption/decryption cycles in the middle data, which constitutes bulk of the compressed data.

However, it should be noted that data compression may use Huffman codes that may be difficult to cryptanalyze. For example, Deflate compression standard uses Huffman codes. A Huffman code table, which is less than 288 bytes large is found in the front data of a Deflate compressed block. The code table is a dictionary that maps each compression symbol to a bit pattern of 1 to 28 bits in length. The symbols are literals 0 to 255 (e.g., ASCII characters included), an End of Block ("EOB") symbol 256, and String Lengths 257 to 285 (e.g., encoding strings of lengths 3 to 258 bytes) and distance symbols 0 to 29. An important feature of Deflate Huffman codes is that they are variable length (1 to 28 bits) and they are prefix-free. "Variable length" and "prefix free" mean that coded symbols in a compressed data stream are not recognizable without a code table and there are no markers identifying code boundaries within the bit stream. Without the code table from the front data (e.g., header), unsecured, but compressed, data becomes merely a sea of bits unrecognizable by human inspection or recovery tools. Decompressing compressed data without the code table is difficult if not impossible. Additionally, codes in the data compression stream are sequentially dependent on each other in terms of length (Huffman) and value (LZ77). A single bit flip in the data compression stream may cause the rest of the compressed stream to be unrecognizable even when the code table is in hand. In the absence of the code table or code table entries, the unsecured file cannot be decoded unambiguously.

Therefore, the present invention protects the front data (e.g., the header) containing the code table with a strong encryption thereby economically concentrating the encryption/decryption cycles on the code table. That is, the present invention provides for securing data compression. Encryption cycles of a data compression stream may be optimized by applying a first type of encryption on a first section and a last section of compressed data and a second type of encryption on a middle section of compressed data, the first type (e.g., a first level) of encryption containing key information relating to the middle section of the compressed data. In one aspect, a first type of encryption is applied on the first section and the last section of compressed data, and a second type of encryption is applied on the middle section of compressed data. However, it should be noted that the present invention may equally be applicable with three different or similar types of encryption each applied to the first, middle, and last sections, respectively.

In an additional aspect, the present invention provides for securing data by hiding the code table. Given the importance of the Huffman code table, the current state of the art attempts to secure compressed data streams by obfuscating the table. For example, using a Multiple Huffman Table ("MHT") approach, the data compression stream may be encoded with multiple Huffman code tables, whose contents and usage order are hidden or kept "private." A Huffman tree of N symbols may have N−1 internal nodes, where "N" is a positive integer. Right and left leaves of each node may be assigned the bits 0 and 1 respectively, or vice versa. As such there may be $2^{(N-1)}$ different code tables for a given tree shape. The MHT operation confuses a potential data threat/attacker by continuously and privately (e.g., securely or "secretly") changing the table contents while encoding the compressed data stream. Unfortunately, in the Deflate compressed data format, a canonical representation of the Huffman tree is used, which means bit assignments to tree leaves cannot be changed, and that for a given a tree shape, only one Huffman code table is possible. Therefore, the present invention protects a single Huffman code table with strong encryption (e.g., strongly encrypting the header and trailer using AES-256 method for example) while protecting the encoded, compressed middle data with other less secure encryption operations such as, for example, using a logic operation (e.g., an "XOR" logic operation) and lightweight encryption (for example using AES-128 or AES-192) since even an unsecured file is difficult to cryptanalyze without a code table.

At this point it should be noted how unsecured and compressed data may be attacked. First, data compression (via the LZ77 and Huffman encoding of Deflate) reduces the redundant information in the source file. In theory, no bias towards 0 or 1 values is found in perfectly compressed data streams. As such, it is difficult to build a statistical model of the compressed data, which makes cryptanalysis of unsecured compressed data difficult. Entropy compression assigns fewer bits to frequent symbols, which has the effect of equalizing statistical distributions of binary values. Even when the Huffman code table is kept private (e.g., secret), there may be some revealing information and assumptions built in to the Deflate that can assist a potential data threat/attacker. Deflate trees are "right handed" trees growing towards the right for longer/deeper branches. Thus, semantic text infrequent letters (e.g. "q" may be encoded with a code that starts with a 1. Whereas other semantic text (e.g., "a" and "e") may use shorter bit length codes, probably assigned to the left hand branch prior to starting with a 0. Therefore, an attacker may guess that an arbitrarily selected field starting with 0 is more probably an "a" or "e" than "q". Additional revealing information is the "Extra" length and distance fields of Deflate codes. The Extra field is encoded as plain binary integer. It is well known by a data compression specialists that shorter string lengths and shorter string distances are more common than longer of the same.

Accordingly, the Extra fields may be biased towards smaller integers therefore making a Deflate stream amenable to statistical modeling. To secure these revealing bits of information, in one embodiment, the present invention may perform a logic operation such as, for example, the XOR logic operation) on the middle data of the compressed data with a random string of equi-probable 1s and 0s. In another aspect, in addition to performing the logic operation of XOR'ing, the present invention may encrypt the middle data such as, for example, using reduced encryption cycles/rounds (e.g., AES-128 or AES-192) of advanced encryption standard ("AES"). Encryption cycles/rounds may be reduced in the middle to economically use most of the encryption cycles elsewhere (e.g., in the header and trailer of the data compression stream).

In one aspect, for performing the logic operation such as, for example, the XOR logic operation) on the middle data, the XOR function may be used because of the identity (e.g., the original XOR Key or "XOR Key=Original"), which means that the Original identity may be recovered by the successive application of the 'Key' (e.g., encrypt then decrypt) since XOR'ing the source data with a random variable of uniform distribution of 1s and 0s yields a uniformly distributed encoded data that obfuscates the original identity. The uniform distribution property removes any biases in the source data making it difficult for an attacker to statistically model the encoded data. In one aspect, the XOR logic operation described herein is used, by way of example only and not to be construed as limiting, because of the available existing central processing units ("CPUs") executed with a high throughput such as, for example 64 bits per CPU cycle. Also, the data mask can be longer than 64 bits.

In one aspect, the present invention may use a random, but private (e.g., secret) XOR mask to confuse the middle data of the compressed data. The XOR mask may be applied to the entire length of the middle data.

In one aspect, a secure hash algorithm ("SHA") may be used to generate the XOR mask. An unencrypted form of the front data (e.g., the header), namely the Huffman code table and the first bytes of the compressed data plus the cipher-key plus the accelerator generated checksums (crc32 concatenated with adler32 of the entire source data), may be used to seed the SHA function, therefore unambiguously generating an XOR mask as a function of the input and the cipher key.

In an additional aspect, a random number may be included in an XOR mask generation, however producing a different bit stream for the same data. The randomly selected XOR mask may be stored in the front or rear of the compressed data stream so as to decrypt the secured message. Also, including the source data checksum in the XOR mask calculation makes some plaintext attacks difficult. Changing even a single bit in the source data will change the 64 bit checksum and therefore resulting in a totally different XOR mask than the previous. Additionally, the symbol frequencies (e.g., part of the accelerator output) may be fed in to the mask calculation increasing the XOR mask diversity as a function of changing source text. The SHA-2 operation may produce a 256 bit XOR mask. A SHA-512 operation may produce a 512 bit XOR mask. On average, nearly equal number of 1s and 0s may be found in a SHA produced XOR mask. If not equal, the first copy may be used to seed another SHA operation until equal number of 1s and 0s are obtained while producing the XOR mask.

In an additional aspect, a strong encrypting on the rear data (e.g., the trailer). A Deflate block may contain two revealing information at the trailer of the data compression stream. The checksum field (e.g., CRC32) is the checksum of the original source. A data threat/attacker can validate a number of guesses by comparing the checksum of his guessed source to the actual checksum stored at the tail of the compressed data. As an additional example, data compression specialists in the past have used this checksum to recover unsecured corrupted files. Accordingly, the present invention secures the checksum field in the rear data (e.g., secures the trailer or EOB of compressed data). Additionally, the EOB field is the last encoded symbol in a Deflate block (LZ symbol 256). It is the only marker symbol among the Deflate symbols, indicating end of a block. Only one EOB symbol is found in any Deflate block. Accordingly the EOB is one of the least frequent symbols if not the only least frequent symbol. With a right handed Huffman tree, when encoded, EOB typically gets the longest Huffman codeword because of its frequency. An EOB might commonly get a codeword of the form 1*, where * denotes 1 to 14 bit sequence of 1s. Thus, an attacker might infer information about the code table such as, for example, the table size, maximum code length, and shape of the Huffman tree by examining the sequence of 1s in the tail of a compressed data stream. Thus, the present invention secures the EOB field in the rear data.

In one aspect, the present invention strongly encrypts the rear data such as, for example, using increased cycles/rounds of AES, such as AES-256. The EOB, the CRC, and a size field of the rear data may be within a defined range or a defined amount (e.g., 10 bytes). Therefore, anywhere from between the defined range (e.g., 10 bytes to 512 bytes) according to the data size minimums required by the encryption operation may be encode with strong encryption.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, "best," "appropriate," and/or "optimize" may be used herein interchangeable and refer to and/or defined as "maximize," "minimize," or attain one or more specific targets, objectives, goals, or intentions. "Best," "appropriate," and/or "optimize" may also refer to maximizing a benefit to a user (e.g., maximize a health state/patient profile). "Best," "appropriate," and/or "optimize" may also refer to making the most effective or functional use of a situation, opportunity, or resource.

Additionally, "best," "appropriate," and/or "optimize" may need not refer to a best solution or result but may refer to a solution or result that "is good enough" for a particular application, for example. In some implementations, an objective is to suggest a "best" combination of sections/items/defined objects, but there may be a variety of factors that may result in alternate suggestion of a combination of sections/items/defined objects yielding better results. Thus, some changes to the variety of factors may result in a jump from one minimum/maximum to another minimum/maximum. In either case, resulting suggestions of a combination of sections of the optimal/best executor nodes may be determined by whatever "bid matching function" may be considered "good enough," "substantially optimal," and/or "sufficiently good." Herein, the terms "best," "appropriate," and/or "optimize" may also refer to such results based on minima (or maxima, depending on what parameters are considered in the optimization problem) for suggesting of a combination of optimal/best executor nodes.

In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, where different physical and virtual resources may be dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16 (e.g., CPUs, GPUs, FPGAs, neural network chips, and the like).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory (and/or non-volatile such as, for example, flash or storage class memory), such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
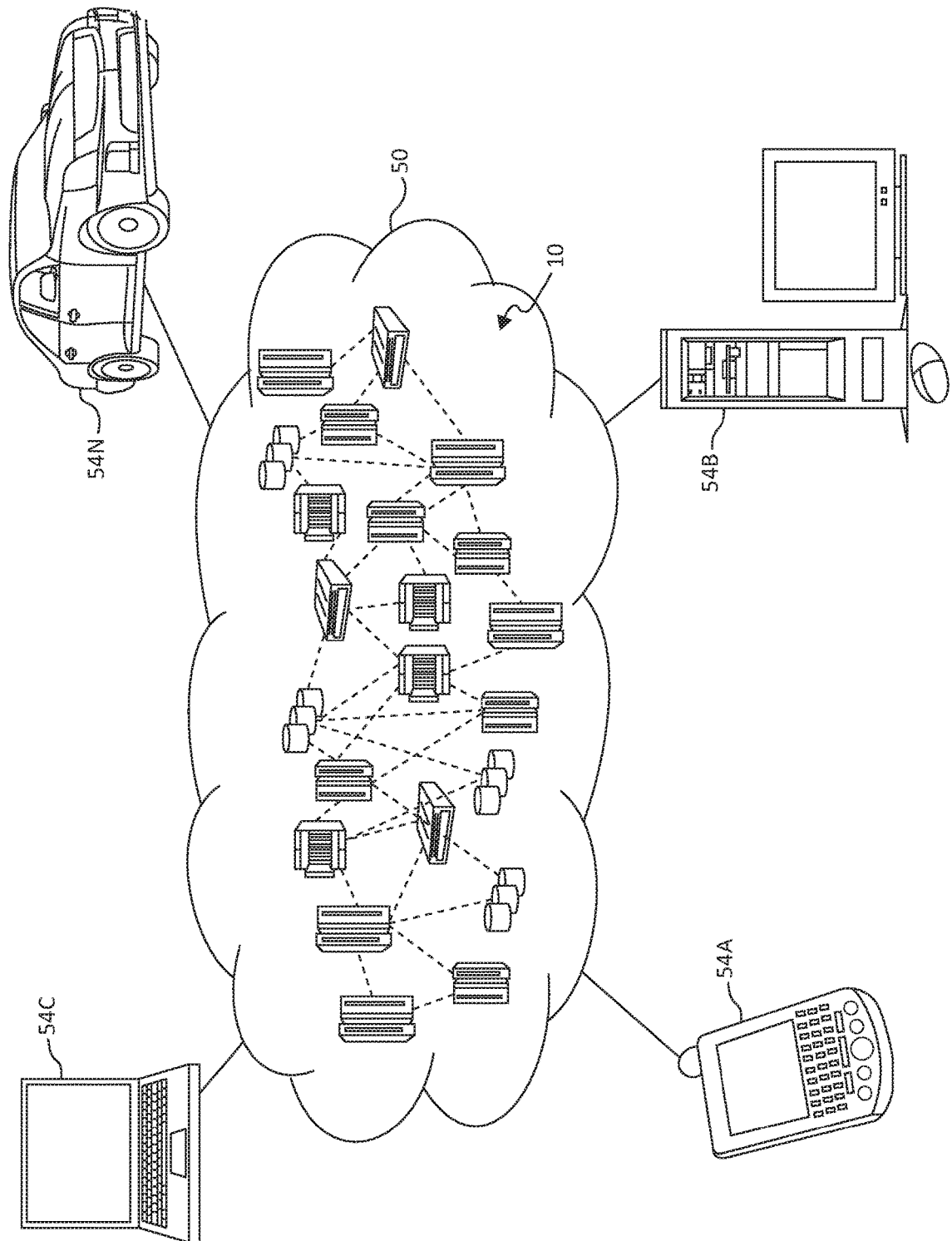
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
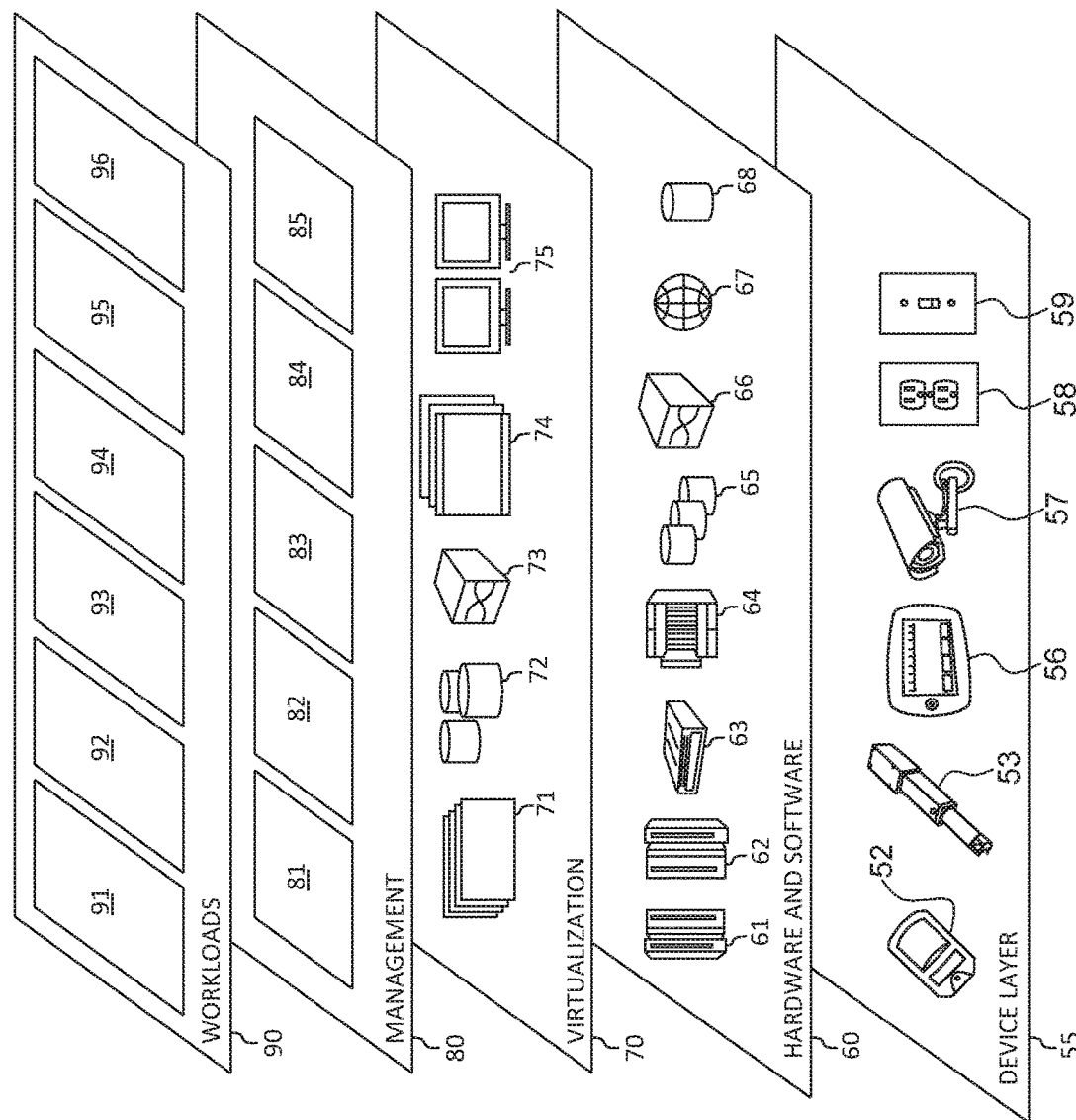
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects. Devices in the device layer may connect through a gateway (not shown for illustrative convenience). The gateway may provide additional management, security, authentication, and access control for devices it manages.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. The management layer 80 may include device management functionality for the Device layer 55 where the management layer 80 (e.g., a device management layer) assigns devices or device gateways to workloads based on authentication and/or authorization. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for securing data compression. In addition, workloads and functions 96 for securing data compression may include such operations as data analytics, data analysis, and as will be further described, notification functionality. One of ordinary skill in the art will appreciate that the workloads and functions 96 for securing data compression may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
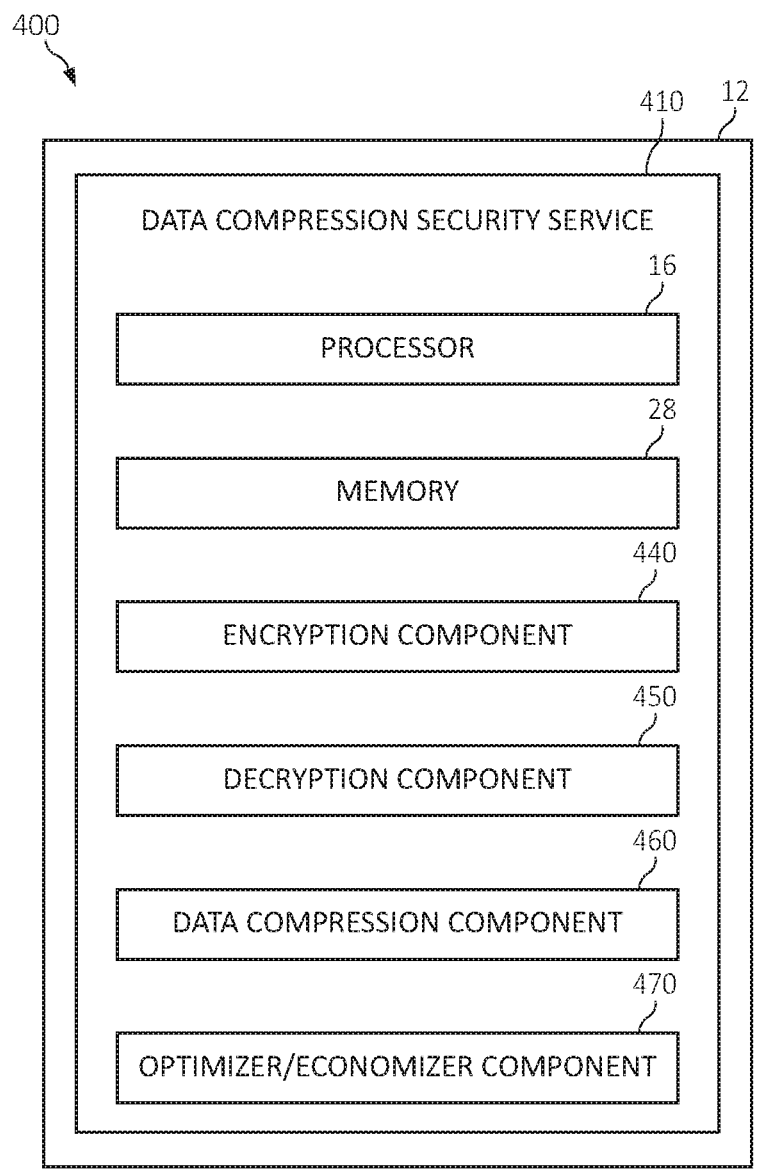
FIG. 4 is an additional block diagram depicting an exemplary functional relationship and operations between various aspects of the present invention.

Turning now to FIG. 4, a block diagram depicting exemplary functional components 400 according to various mechanisms of the illustrated embodiments is shown. FIG. 4 illustrates a system 400 for securing data compression in a computing environment. In one aspect, one or more of the components, modules, services, applications, and/or functions described in FIGS. 1-3 may be used in FIG. 4. In one aspect, repetitive description of like elements, components, modules, services, applications, and/or functions employed in other embodiments described herein (e.g., FIGS. 1-3) is omitted for sake of brevity.

With the foregoing in mind, the module/component blocks 400 may also be incorporated into various hardware and software components of a system for securing data compression in accordance with the present invention. Many of the functional blocks 400 may execute as background processes on various components, either in distributed computing components, or on the user device, or elsewhere.

Computer system/server 12 of FIG. 1 is shown incorporating a data compression security service 410. The data compression security service 410 may incorporate processing unit 16 ("processor") and memory 28 of FIG. 1 to perform various computational, data processing and other functionality in accordance with various aspects of the present invention. The data compression security service 410 may be provided by the computer system/server 12 of FIG. 1.

As one of ordinary skill in the art will appreciate, the depiction of the various functional units in the data compression security service 410 is for purposes of illustration, as the functional units may be located within the data compression security service 410 or elsewhere within and/or between distributed computing components.

In one aspect, the computer system/server 12 and/or the data compression security service 410 may provide virtualized computing services (i.e., virtualized computing, virtualized storage, virtualized networking, etc.). More specifically, the data compression security service 410 may provide, and/or be included in, a virtualized computing, virtualized storage, virtualized networking and other virtualized services that are executing on a hardware substrate.

The data compression security service 410 may include an encryption component 440, a decryption component 450, a data compression component 460, and an optimizer/economizer component 470, each of which may be in communication with each other.

In one aspect, the data compression component 460 may compress source data to generate a first section (e.g., a header) of compressed data of a data compression stream, a last section of the compressed data (e.g., a trailer), and a middle section of the compressed data (e.g., a body of the compressed data).

The optimizer/economizer component 470, using the encryption component 440 and/or the decryption component 450, may optimize one or more encryption cycles of the data compression stream by applying a first type of encryption on the first section (e.g., the header) and a last section (e.g., the trailer) of the compressed data and a second type of encryption on a middle section of compressed data. The first type of encryption may contain key information relating to the middle section of the compressed data. The key information may be the XOR mask to be used in the middle section as described herein. In other words, a secret XOR mask is hidden in the first section secured by the first type encryption. After encrypting the middle section, the XOR mask used for that purpose is stored in the header, which is encrypted using first type encryption (by analogy, the middle section key is stored in a strong box in the header section).

The optimizer/economizer component 470, using the encryption component 440 and/or the decryption component 450, may save each encryption cycle and decryption cycles in the middle section of the compressed data. The optimizer/economizer component 470, using the encryption component 440 and/or the decryption component 450, may apply the first type of encryption as a strong encryption and the second type of encryption as a lightweight encryption, the strong encryption being more secure than the lightweight encryption.

In an additional aspect, the optimizer/economizer component 470, using the encryption component 440 and/or the decryption component 450, may apply the first type of encryption on the first section and the last section of compressed data and the second type of encryption on the middle section of compressed data upon completion of compressing source data, by the data compression component 460.

The optimizer/economizer component 470, using the encryption component 440 and/or the decryption component 450, may also dynamically switch between applying the first type of encryption and the second type of encryption.

Additionally, the optimizer/economizer component 470 may combine the first section and the last section, each having the first type of encryption, together with the middle section having the second type of encryption transforming the compressed data into encrypted and compressed data.

Figure 5:
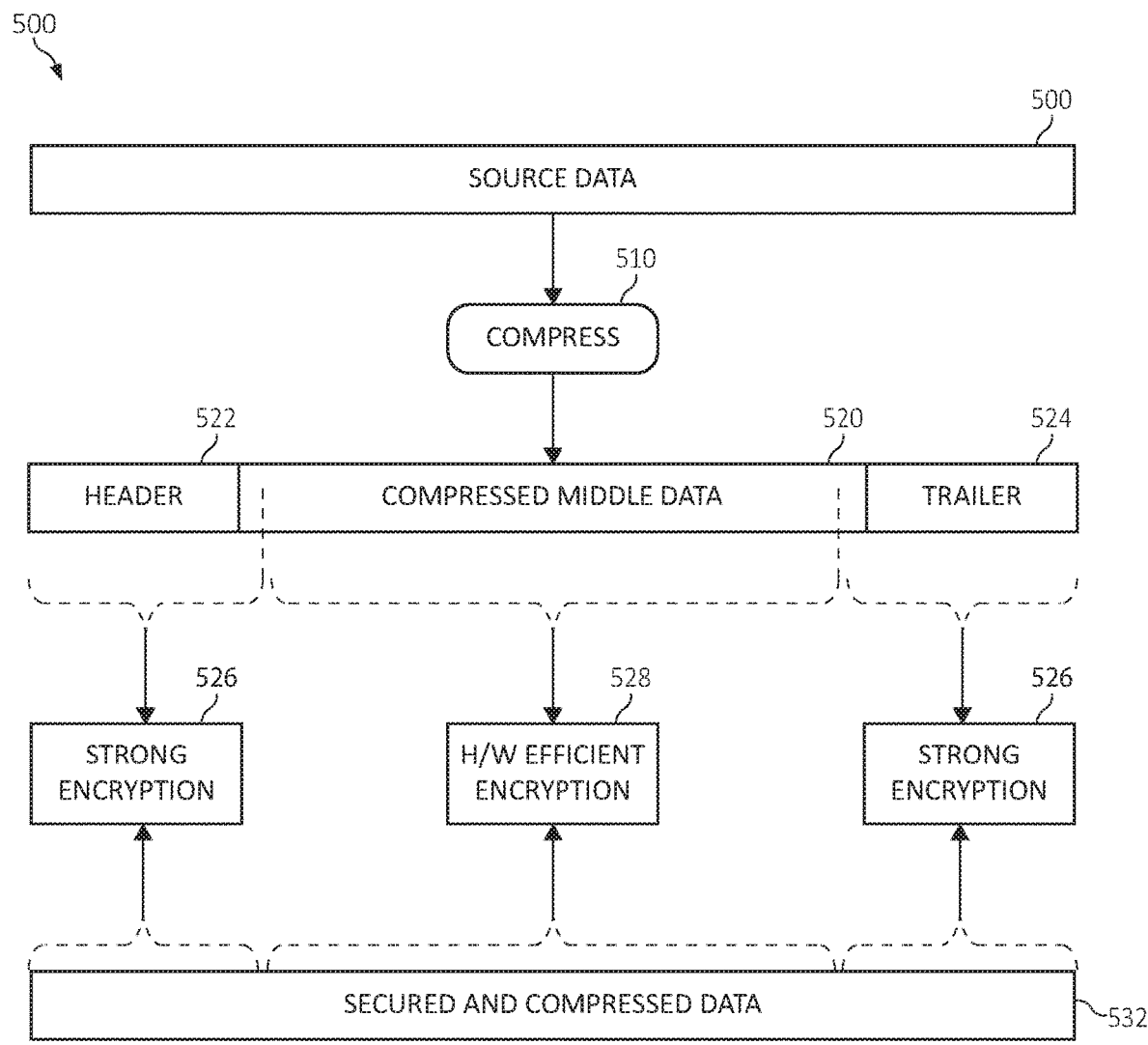
FIG. 5 is block diagram depicting an additional exemplary operations for securing data compression by a processor in which aspects of the present invention may be realized.

Turning now to FIG. 5, a block diagram of exemplary functionality 500 relating to secure data compression is depicted, according to various aspects of the present invention. In one aspect, one or more of the components, modules, services, applications, and/or functions described in FIGS. 1-4 may be used in FIG. 5. Repetitive description of like elements, components, modules, services, applications, and/or functions employed in other embodiments described herein (e.g., FIGS. 1-4) is omitted for sake of brevity.

As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for providing secure data compression in accordance with the present invention. Many of the functional blocks 500 may execute as background processes on various components, either in distributed computing components, or on the user device, or elsewhere.

Starting with block 502, source data 502 may be received, collected, and/or accessed. The source data 502 may then be compressed using one or more compression operations, as in block 510. The compressed data may include a header 522 (e.g., a leading or "front" section of a compressed data steam), compressed middle data 520 (e.g., a middle section of compressed data or the "body" of a compressed data stream), and a trailer 524 (e.g., a last or "rear" section of a compressed data steam). Since the source data 502 is now compressed, the compressed data (e.g., the header 522, the compressed middle data 520, and the trailer 524) may be encrypted at a higher bandwidth based on the compression such as, for example, encryption is increased from 18 gigabytes ("GB") per second ("GB/PS") to 102 GB/PS.

It should be noted that for the compression operation, Huffman encoding, for example, may be used to assign codes to characters such that the length of the code depends on the relative frequency or weight of the corresponding character. That is, a data compression accelerator may use Huffman encoding on the header 522 to map Lempel-Ziv77 ("LZ77") symbols to 1bit-28-bit code words. In the absence of the code table stored in the header 522, the compressed middle data 520 is unable to be decoded, particularly since a Huffman code is difficult to cryptanalyze (e.g., "cryptanalysis"—the process of deciphering coded message without being told the key). Also, the data compression on the compressed middle data 520 eliminates all redundancy in the source data 502. The data compression (e.g., a lossless data compression such as, for example, LZ77) may eliminate duplicate strings. The Huffman encoding may convert bytes to variable length symbols 1 to 28 bits each. Also, any symbol boundaries may disappear and a sea of bytes may turn in to sea of bits (no 0 to 1 bias) hence statistical model is not possible. Additionally, the trailer 524 may contain a checksum of the source data 502 that may be used "breaking" the compressed middle data 520. Thus, the objective of the present invention is to economize encryption cycles or encryption hardware by protecting the header 522 and the trailer 524 with strong encryption while using less encryption resources for the compress middle data 520, which may be difficult to decode.

Accordingly, a first type of encryption operation may be performed on the header 522 where the encryption is a "strong encryption" 526. Similarly, the first type of encryption operation may be performed on the trailer 524 where the encryption is also a "strong encryption" 526. That is, strong crypto cycles are used only in the header 522 and trailer 524 of the compressed stream. The compressed data (e.g., file) header 522 and trailer 524 contains critical data without which the compressed data cannot be reconstructed even when unsecured. In one aspect, the header 522 uses an advanced encryption standard ("AES") (e.g., a symmetric block cipher) with 256 bit keys, or a stronger cryptographic operations. The header 522 length may be hundreds (100's) of bytes. The trailer 524 length may be 8 bytes and the bulk of the data may be in the compressed middle data 520, which may be megabytes in length.

In contrast, a second type of encryption operation may be performed on the compressed middle data 520, where the encryption is a hardware "H/W" efficient encryption" 528 (e.g., a lightweight encryption). That is, the hardware "H/W" efficient encryption" 528 is less strong than compared to the strong encryption 526 and 528 applied to the header 522 and the trailer 524. The compressed middle data 520 the data compress stream may use one or more types of hardware efficient ("H/W") cryptographic operations, which economizes the encryption/decryption processing time and hardware resources. In one aspect, by way of example only, the compressed middle data 520 the data compress stream may use an AES with 128 bit or 192 bit keys.

Thus, by applying a stronger encryption to the header 522 and the trailer 524, which applying a lightweight encryption on the compressed middle data 520, any silicon resources and crypto cycles may be economized over smaller, compressed data while also preventing degradation in the compressing ratio as compared to unsecured, compressed data.

As depicted in block 532, the strong encryption 526 applied to the header 522 and the trailer 524 along with the H/W efficient encryption 528 applied to the compressed middle data 520 may be combined to yield secured and compressed data. It should be noted that, FIG. 5 depicts, by way of example only, the use of strong encryption operations/methods for the header and trailer. However, it should be noted that the selection of the type of encryption operations/methods for strong encryption may be the same/identical or different for the header and the trailer thereby providing various levels of flexibility for implementation of the strong encryption for the header and the trailer.

To further illustrate, consider the following exemplary functionality 600 and 615 relating to secure data compression applying the operations described in FIGS. 4 and 5. In one aspect, repetitive description of like elements, components, modules, services, applications, and/or functions employed in other embodiments described herein (e.g., FIGS. 1-5) is omitted for sake of brevity.

Figure 6A:
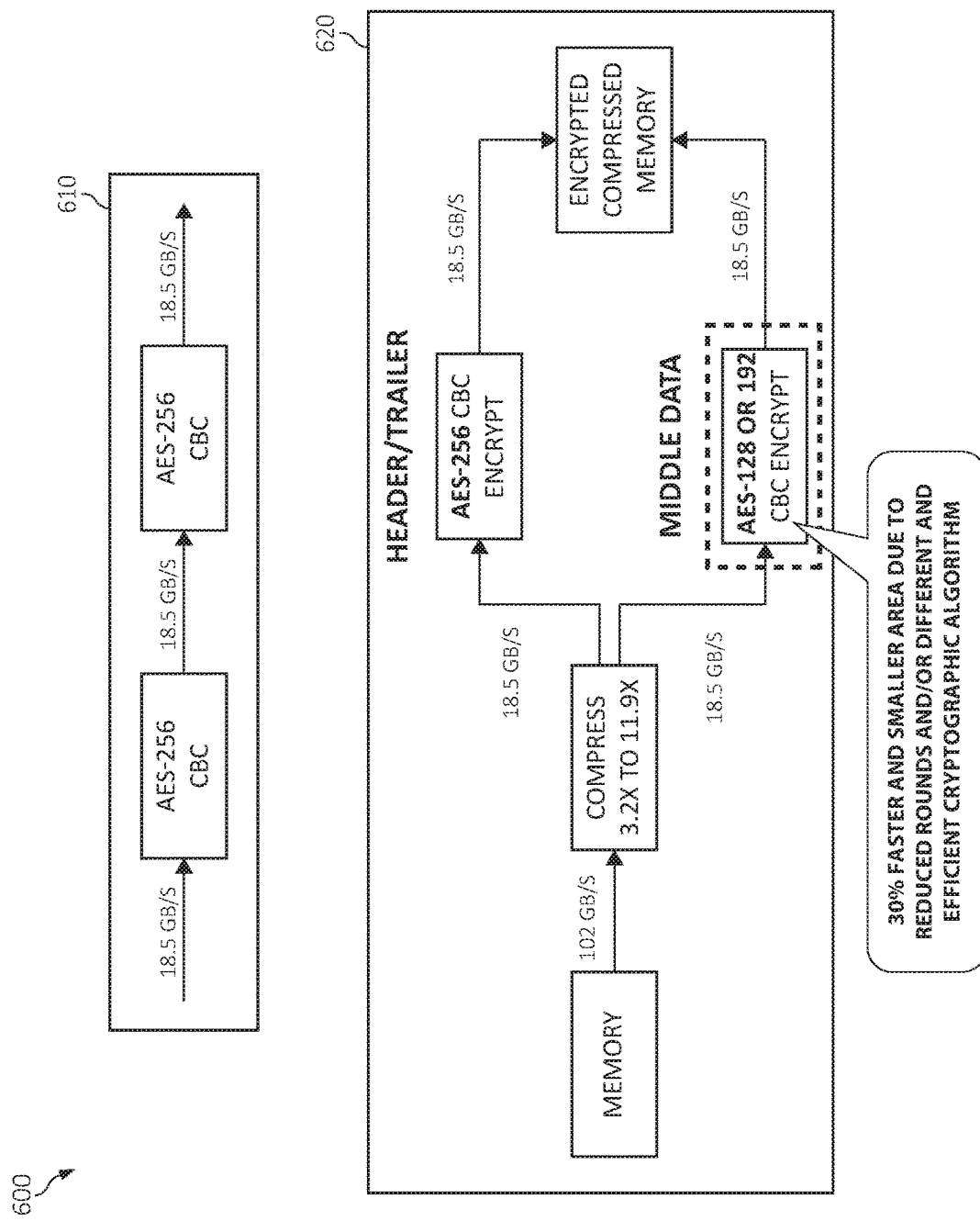
FIG. 6a is block diagram depicting an additional exemplary operation for securing data compression by a processor in which aspects of the present invention may be realized.

Turning now to diagram 600 of FIG. 6A, operation 610 depicts functionality without applying the exemplary functionality of the present invention. That is, operation 610 depicts the entire source data is received and encrypted with a throughput at 18 GB/S using AES-256 cyber block chaining ("CBC") encryption. As noted previously, there is an arbitrary amount of time between encryption and decryption in which the data is stored. The location of the data and the length of time are not depicted in 610.

In contrast, operations 620 apply the exemplary functionality of the present invention to compress and encrypt the data. In block 620, the data is depicted as coming from memory. Memory represents the source of the data that may be a network interface, computer memory such as, for example, dynamic random-access memory ("DRAM"), or a storage device such as, for example, a disk or flash drive. The data header and trailer (e.g., header 522 and trailer 524 of FIG. 5) may be received by the compression engine with a throughput at 102 GB/S and first compressed such as, for example, compressed from 3.2 times to 11.9 times compression rate.

After compression, the header and trailer are routed to strong encryption and the middle of the compressed data is routed to a lightweight encryption. Strong encryption is represented, by way of example only, as AES-256 and lightweight encryption is represented, by way of example only, as AES-128 or AES-192. After encryption the sections are written to memory. Memory represents any medium where the compressed encrypted data is stored prior to the next required use. It should be noted that the metadata must be written with the encrypted data to memory so that the location, header, middle, or trailer, is known for decryption and decompression. The compressor may feed the data into the encryption algorithm at 18.5 GB/S or more. The size of the block of data that are compressed and encrypted by mechanisms of the illustrated embodiments may vary. In a memory system, memory may be viewed in terms of pages, but the page size may vary. In one aspect, meta data, such as, for example, a radix tree, must be used so that when the source data is required the correct blocks can be located, unencrypted and decompressed.

Figure 6B:
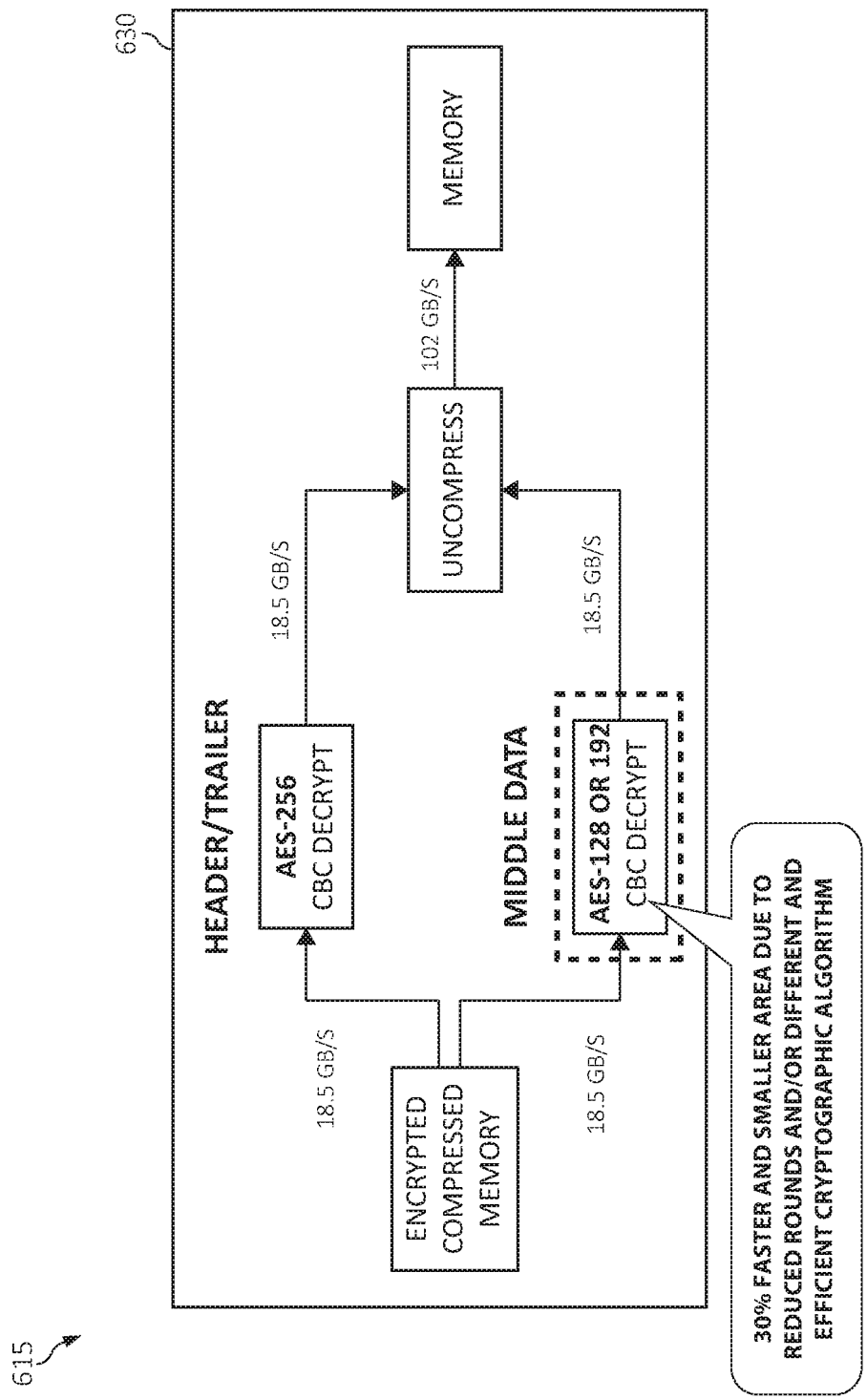
FIG. 6b is a block diagram depicting the operation of making secure data available in a non-secure form.

Turning now to diagram 615 of FIG. 6B, which illustrates operations required to provide access to the unencrypted data. The encrypted compressed blocks of memory are partitioned. The header and trailer blocks are routed to strong encryption and the middle blocks are routed to lightweight encryption. After decryption, the sections are assembled in memory so that they can be uncompressed. The header, middle section, and trailer of the unencrypted block are marked so that decompression function will function properly. This data is fed to the decompressor which writes the decompressed data back into memory. Once the data is decrypted, the output of the decompressor can be 102 GB/S. Thus, in one aspect, by way of example, only, the present invention may be faster (e.g., 30% faster) and smaller than operations as compared to the current state of the art. For example, using the lightweight encryption on the middle data is faster and smaller than the current state of the art due to reduced encryption cycles/rounds (e.g., AES-128 or AES-192) of advanced encryption standard ("AES") and/or different and efficient cryptographic operations, as illustrated in FIGS. 6A and 6B. Thus, the encryption cycles/rounds may be reduced in the middle (e.g., by at least 30%) to economically use most of the encryption cycles elsewhere (e.g., in the header and trailer of the data compression stream).

Figure 7:
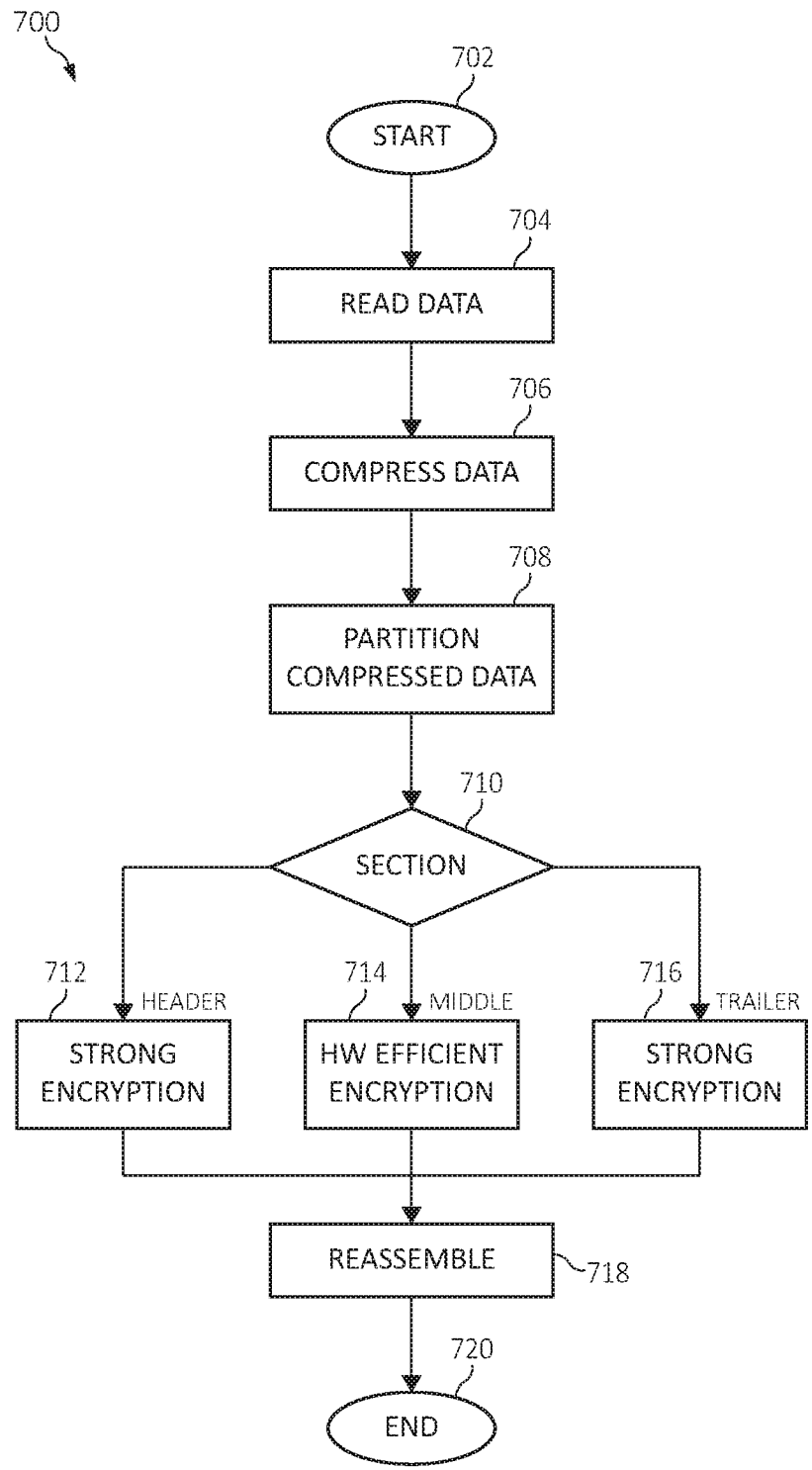
FIG. 7 is an additional flowchart diagram depicting an exemplary method for securing data compression by a processor, again in which aspects of the present invention may be realized.

Turning now to FIG. 7, a method 700 for securing data compression by a processor is depicted, in which various aspects of the illustrated embodiments may be implemented. That is, FIG. 7 depicts an overview of the encryption aspect of mechanisms of the illustrated embodiments. The functionality 700 may be implemented as a method executed as instructions on a machine, where the instructions are included on at least one computer readable medium or one non-transitory machine-readable storage medium. In one aspect, one or more of the components, modules, services, applications, and/or functions described in FIGS. 1-6A-6B may be used in FIG. 7. Repetitive description of like elements, components, modules, services, applications, and/ or functions employed in other embodiments described herein (e.g., FIGS. 1-6A-6B) is omitted for sake of brevity.

The functionality 700 (e.g., process) may start in block 702. The data to be compressed and encrypted is acquired, or read, as in block 704. The data is then compressed, as in block 706. After the data is compressed, the header trailer and middle data are identified and partitioned, as in block 708.

The compressed data may be encrypted by routing each part (e.g., each section) to an appropriate cryptographic algorithm, as in block 710. In one aspect, the header may be routed to strong encryption, as in block 712, the middle portion route to lightweight encryption, as in block a714, and the trailer to strong encryption, as in block 716.

Afterwards, the encrypted parts may be reassembled (and placed into "storage"), as in block 718. As has been stated before appropriate meta data must be part of the result so that the data can be properly accessed for decryption. The functionality 700 may end, as in block 720.

As illustrated in FIG. 7, the encryption of the different parts of the data may be performed in parallel. It should also be noted that one could break the data into more than three parts/section. Thus, in one aspect, FIG. 7 depicts separating the data into at least three parts/sections. Thus, the number of parts/sections, the number of operations used, and the location of key material may each be associated with a selected or specific implementation. The required information for any particular implementation may be selected and applied according to one of ordinary skill in the art.

In one aspect, in conjunction with and/or as part of at least one block of FIG. 7, the operations of method 700 may include each of the following. The operations of method 700 may compress source data to generate the first section, the last section and the middle section of the compressed data, 706. In one aspect, the first section is a header and the last section is a trailer in the compressed data.

The operations of method 700 may save each encryption cycle and decryption cycles in the middle section of the compressed data. The operations of method 700 may apply the first type of encryption as a strong encryption and the second type of encryption as a lightweight encryption, the strong encryption being more secure than the lightweight encryption. The operations of method 700 may apply the first type of encryption on the first section and the last section of compressed data and the second type of encryption on the middle section of compressed data upon completion of compressing source data. The three sections of the compressed data may be encrypted in parallel, as illustrated in FIG. 7. The operations of method 700 may dynamically switch between applying the first type of encryption and the second type of encryption.

The operations of method 700 may combine the first section and the last section, each having the first type of encryption, together with the middle section having the second type of encryption transforming the compressed data into encrypted and compressed data, 718.

Figure 8:
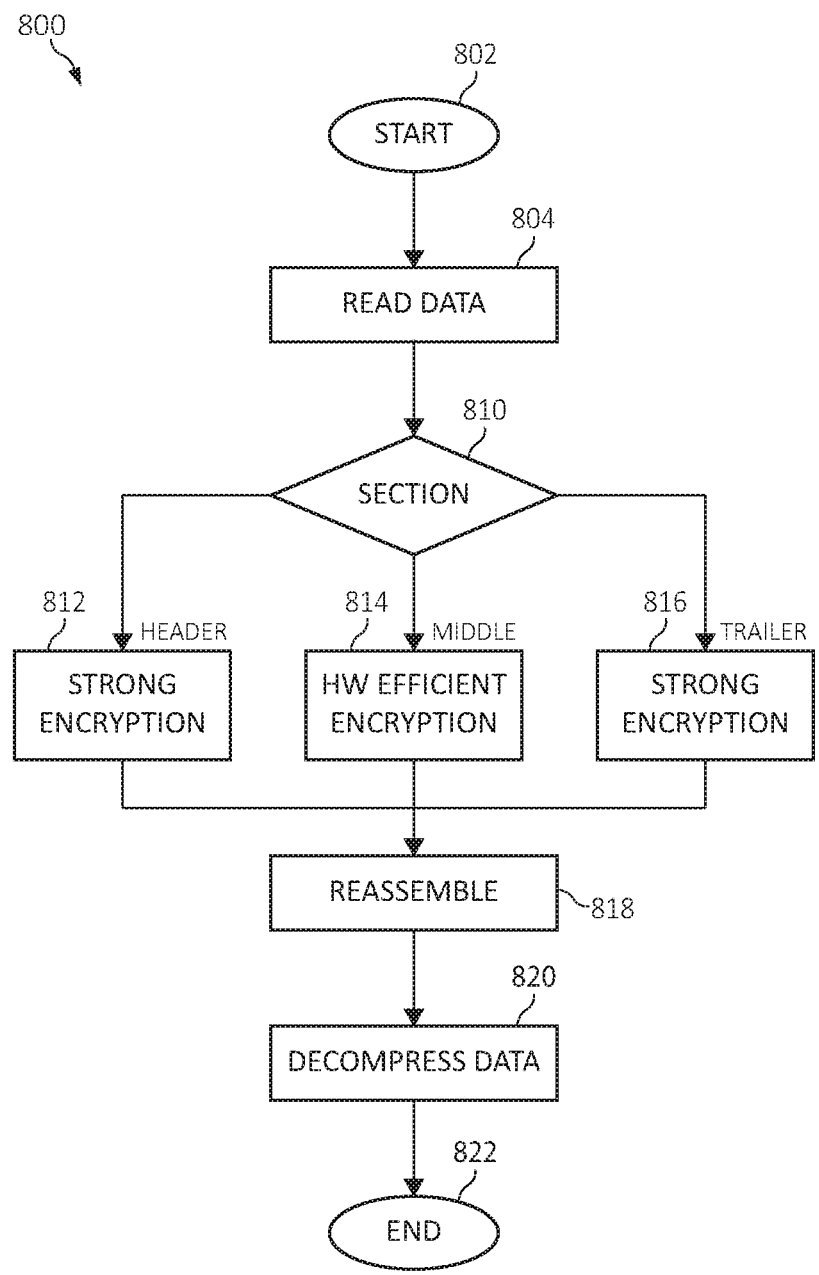
FIG. 8 is an additional flowchart diagram, depicting a method for decompressing data in a processor, again in which aspects of the present invention may be realized.

Turning now to FIG. 8, a method 800 for decrypting and decompressing encrypted compressed data by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. In one aspect, one or more of the components, modules, services, applications, and/or functions described in FIGS. 1-7 may be used in FIG. 8. Repetitive description of like elements, components, modules, services, applications, and/or functions employed in other embodiments described herein (e.g., FIGS. 1-7) is omitted for sake of brevity. The functionality 800 may start in block 802.

The encrypted compressed memory to be decrypted is read, along with the meta data, as in block 804. In block 810, the encrypted compressed data may be partitioned into sections, as illustrated a header middle and trailer. Each section may be routed to the appropriate decryption engine, with the necessary metadata. That is, the header may be routed to a strong decryption, as in block 812, the middle routed to lightweight decryption, as in block 814, and the trailer routed to strong decryption, as. In block 816. (Representative decryption algorithms are illustrated in FIG. 6.) After decryption, the three sections are reassembled into compressed data, using the meta data, as in block 818. The compressed data may be passed to the decompression function, as in block 820. After decompression, all of the data may be placed in an appropriate location and the function ends, as in block 822.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for securing data compression by a processor, comprising:
    optimizing encryption cycles of a data compression stream by applying a first type of encryption on a first section and a last section of compressed data and a second type of encryption on a middle section of the compressed data, the first type of encryption containing key information relating to the middle section of the compressed data, wherein the middle section of the compressed data is confused using an Exclusive-OR (XOR) mask with a random variable of distribution of binary variables.

2. The method of claim 1, further including saving each encryption cycle and decryption cycle in the middle section of the compressed data.

3. The method of claim 1, wherein applying the first type of encryption and the second type of encryption further includes applying the first type of encryption as a strong encryption and the second type of encryption as a lightweight encryption, the strong encryption being more secure than the lightweight encryption.

4. The method of claim 1, further including compressing source data to generate the first section, the last section, and the middle section of the compressed data, wherein the first section is a header and the last section is a trailer in the compressed data.

5. The method of claim 1, further including applying the first type of encryption on the first section and the last section of the compressed data and the second type of encryption on the middle section of the compressed data upon completion of compressing source data.

6. The method of claim 1, further including:
    dynamically switching between applying the first type of encryption and the second type of encryption; or
    applying the first type of encryption as a strong encryption on the first section and the last section of compressed data, wherein the first type of encryption on the first section is a different type of strong encryption than the first type of encryption on the last section.

7. The method of claim 1, further including combining the first section and the last section, each having the first type of encryption, together with the middle section having the second type of encryption transforming the middle section of the compressed data into encrypted and compressed data.

8. A system for securing data compression in a computing environment, comprising:
    one or more computers with executable instructions that when executed cause the system to:
        optimize encryption cycles of a data compression stream by applying a first type of encryption on a first section and a last section of the compressed data and a second type of encryption on a middle section of the compressed data, the first type of encryption containing key information relating to the middle section of the compressed data, wherein the middle section of the compressed data is confused using an Exclusive-OR (XOR) mask with a random variable of distribution of binary variables.

9. The system of claim 8, wherein the executable instructions further save each encryption cycle and decryption cycles in the middle section of the compressed data.

10. The system of claim 8, wherein the executable instructions further apply the first type of encryption as a strong encryption and the second type of encryption as a lightweight encryption, the strong encryption being more secure than the lightweight encryption.

11. The system of claim 8, wherein the executable instructions further compress source data to generate the first section, the last section and the middle section of the compressed data, wherein the first section is a header and the last section is a trailer in the compressed data.

12. The system of claim 8, wherein the executable instructions further apply the first type of encryption on the first section and the last section of the compressed data and the second type of encryption on the middle section of the compressed data upon completion of compressing source data.

13. The system of claim 8, wherein the executable instructions further:
    dynamically switch between applying the first type of encryption and the second type of encryption; or
    apply the first type of encryption as a strong encryption on the first section and the last section of compressed data, wherein the first type of encryption on the first section is a different type of strong encryption than the first type of encryption on the last section.

14. The system of claim 8, wherein the executable instructions further combine the first section and the last section, each having the first type of encryption, together with the middle section having the second type of encryption transforming the middle section of the compressed data into encrypted and compressed data.

15. A computer program product for securing data compression by a processor, the computer program product comprising a non-transitory computer-readable storage medium having computer-readable program code portions stored therein, the computer-readable program code portions comprising:
    an executable portion that optimizes encryption cycles of a data compression stream by applying a first type of encryption on a first section and a last section of compressed data and a second type of encryption on a middle section of the compressed data, the first type of encryption containing key information relating to the middle section of the compressed data, wherein the middle section of the compressed data is confused using an Exclusive-OR (XOR) mask with a random variable of distribution of binary variables.

16. The computer program product of claim 15, further including an executable portion that save each encryption cycle and decryption cycles in the middle section of the compressed data.

17. The computer program product of claim 15, further including an executable portion that applies the first type of encryption as a strong encryption and the second type of encryption as a lightweight encryption, the strong encryption being more secure than the lightweight encryption.

18. The computer program product of claim 15, further including an executable portion that compresses source data to generate the first section, the last section and the middle section of the compressed data, wherein the first section is a header and the last section is a trailer in the compressed data.

19. The computer program product of claim 15, further including an executable portion that:

applies the first type of encryption on the first section and the last section of the compressed data and the second type of encryption on the middle section of the compressed data upon completion of compressing source data;

applies the first type of encryption as a strong encryption on the first section and the last section of compressed data, wherein the first type of encryption on the first section is a different type of strong encryption than the first type of encryption on the last section; or dynamically switches between applying the first type of encryption and the second type of encryption.

20. The computer program product of claim 15, further including an executable portion that combines the first section and the last section, each having the first type of encryption, together with the middle section having the second type of encryption transforming the middle section of the compressed data into encrypted and compressed data.

* * * * *